United States Patent [19]

Niwa et al.

[11] Patent Number: 4,561,327
[45] Date of Patent: Dec. 31, 1985

[54] APPARATUS FOR CONTROLLING SPEED RATIOS OF A CONTINUOUSLY VARIABLE TRANSMISSION

[75] Inventors: Takao Niwa; Takeshi Gono; Akinori Osanai, all of Susono, Japan

[73] Assignee: Toyota Jidosha Kabushiki Kaisha, Japan

[21] Appl. No.: 612,653

[22] Filed: May 21, 1984

[30] Foreign Application Priority Data

May 26, 1983 [JP] Japan .................. 58-93037

[51] Int. Cl.⁴ .................. B60K 41/12; B60K 41/18
[52] U.S. Cl. .................. 74/866; 74/859; 364/424.1
[58] Field of Search .................. 74/866, 860, 859, 858; 474/11; 364/424.1

[56] References Cited

U.S. PATENT DOCUMENTS

| | | | |
|---|---|---|---|
| 3,913,418 | 10/1975 | Miyao et al. | 74/859 X |
| 4,091,690 | 5/1978 | Miyao | 74/867 X |
| 4,291,594 | 9/1981 | Baudoin | 74/866 X |
| 4,408,293 | 10/1983 | Avins | 364/424.1 X |
| 4,481,844 | 11/1984 | Ironside et al. | 74/859 X |

Primary Examiner—Leslie A. Braun
Assistant Examiner—Dirk Wright
Attorney, Agent, or Firm—Parkhurst & Oliff

[57] ABSTRACT

An apparatus for controlling speed ratios of a continuously variable transmission who enables to obtain a fixed vehicle speed when an engine brake is effected. The continuously variable transmission has a means which memorizes a desired vehicle speed under a condition when the vehicle runs under the effect of the engine brake, and a speed ratio control means which controls the speed ratios so that the desired vehicle speed may equal the actual vehicle speed.

5 Claims, 6 Drawing Figures

APPARATUS FOR CONTROLLING SPEED RATIOS OF A CONTINUOUSLY VARIABLE TRANSMISSION

BACKGROUND OF THE INVENTION

The present invention relates to an apparatus for controlling speed ratios of a continuously variable transmission (hereinafter referred to as CVT) installed in a vehicle, and particularly to an apparatus for controlling a continuously variable transmission to obtain a fixed vehicle speed when an engine of the vehicle is acted as a brake.

A CVT with a V-belt extending between driving and driven pulleys, with one or both of the pulleys being able to adjust the size of their respective V-shaped openings which hold the V-belt, thereby controlling the revolution ratio between the driving and driven pulleys. The size of the V-shaped opening is varied by changing the amount of pressure being fed into or drained from a hydraulic cylinder of either of the pulleys. Hence, the effective diameter of the pulley can be varied by changing the amount of pressure being fed into or drained from the hydraulic cylinder, thereby allowing for a continuously varying ratio of driving pulley diameter to driven pulley diameter. The V-shaped openings on the driving and driven pulleys are each defined by an area between a fixed member of the pulley and a movable member of the pulley, the size of the V-shaped opening being dependent upon the pressure inputted to or drained from the hydraulic cylinders. In order to provide hydraulic pressure to each of the movable pulleys, a hydraulic apparatus, is provided. Such a CVT has been employed from the standpoint that it can obtain a minimum fuel consumption rate.

In a vehicle installed with a CVT which transmits an engine power to wheels with a continuous transmission ratio, a minimum fuel consumption rate, which is varied according to an engine load, can be obtained by controlling a speed ratio of the rotation speed of an output shaft to the rotation speed of an input shaft (=(the rotation number of the output shaft)/(the rotation number of the input shaft)). According to a prior CVT, when a vehicle runs on the condition when the engine is acted as a brake and the engine brake is effected, the following operation is made: To minimize the fuel consumption, an operation is made such as the speed ratio is set to its maximum value and the effect of the engine brake is reduced. According to another operation, the connection between the engine and the CVT is disengaged by an actuation of a clutch to minimize the fuel consumption. Hence, when a vehicle runs on the condition with the effect of the engine brake, for example, on a condition that the vehicle goes down a slope, the vehicle speed increases. To obtain the appropriate vehicle speed, the frequent braking operation is necessitated.

SUMMARY OF THE INVENTION

The present invention was made in view of the foregoing background and to overcome the foregoing drawbacks. It is an object of this invention to provide an apparatus which controls a speed ratio of a continuously variable transmission to obtain a fixed vehicle speed when an engine brake is effected.

To obtain the above object, an apparatus according to the present invention, for controlling speed ratios of a continuously variable transmission installed in a vehicle having an engine therein, the transmission having an input shaft and an output shaft and the speed ratio of a rotating speed of the output shaft to a rotating speed of the input shaft being continuously varied, comprising:

a means for detecting an actual vehicle speed;

a means for detecting an engine brake of the vehicle;

a means for memorizing a desired vehicle speed under a condition when the vehicle runs under the effect of the engine brake; and a speed ratio control means which controls the speed ratios of the continuously variable transmission so that the desired vehicle speed may equal the actual vehicle speed.

The above object, features and advantages of the present invention will become more apparent from the following description of the preferred embodiments taken in conjunction with the accompanying drawings.

DETAILED DESCRIPTION OF THE PREFERRED EMBODIMENTS

The present invention is described in detail with reference to the accompanying drawings which illustrate different embodiments of the present invention.

Figure 1:
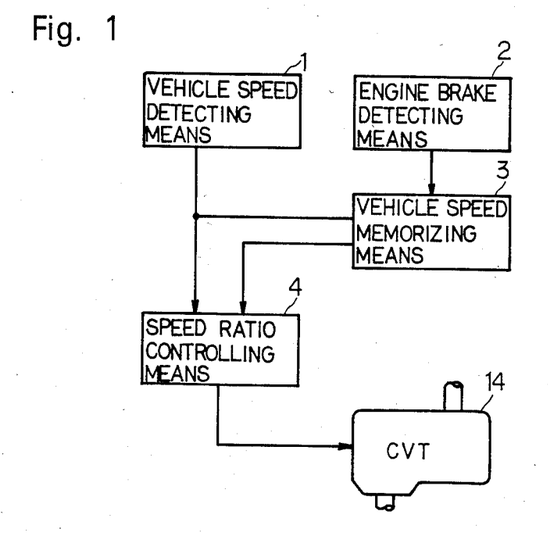
FIG. 1 is a schematic view illustrating a connected relation between elements employed in the apparatus according to the present invention.

FIG. 1 shows a connected relation between elements employed in the apparatus according to the present invention. When an engine is acted as a brake and an engine brake is detected by an engine brake detecting means 2, a speed ratio controlling means 4 controls the speed ratio of continuously variable transmission 14 so that an actual vehicle speed, detected by a vehicle speed detecting means 1, may become same as a desired vehicle speed which is memorized in a vehicle speed memorizing means 3.

Figure 2:
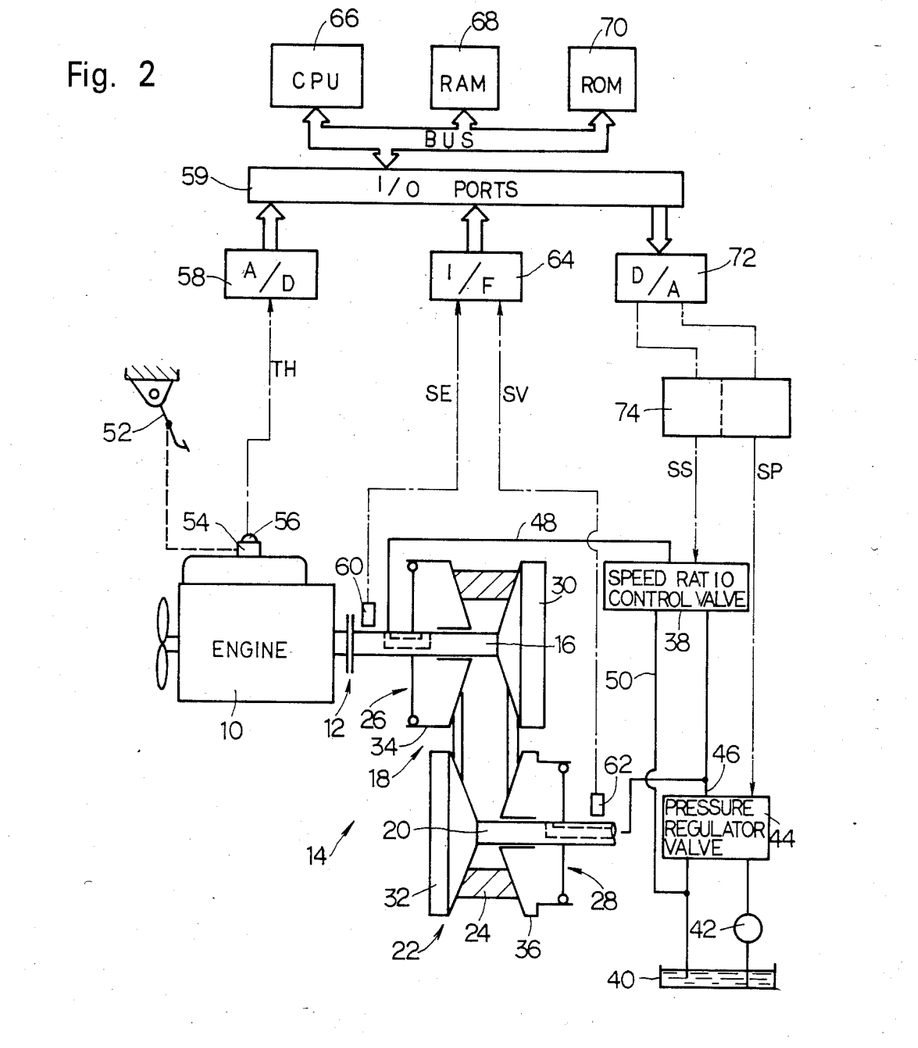
FIG. 2 is a schematic view of the hydraulic apparatus and a circuit diagram of the electronic control unit employed in the apparatus of the present invention.

FIG. 2 illustrates a schematic view of the hydraulic apparatus and a circuit diagram of the electronic control unit employed in the apparatus of the present invention. An engine 10 is connected through a clutch 12 with a shaft 16. The shaft 16 is an input shaft connected with a CVT 14. The CVT 14 has a couple of pulleys 18 and 22. The pulley 18 is a driving pulley mounted on the driving and input shaft 16 which is driven by the engine 10. The other pulley 22 is a driven pulley mounted on a driven and output shaft 20. The torque of the shaft 20 is outputted to wheels (not shown in drawings). A torque transmitting continuous V-belt 24 extends between the pulleys 18 and 22. The driving pulley 18 has a movable member 34, which is axially displaced on and rotates with the input shaft 16, and a member 30, which is fixed to and rotates with the input shaft 16. The movable member 34 is axially displaced by the pressure exerted upon it by a hydraulic cylinder 26. When the movable member 34 is axially displaced in a direction toward the opposite member 30, the width defined between the members 34 and 30 is decreased. The amount of the oil supplied through a speed ratio control valve 38 to the cylinder 26 is controlled. This results in an increase in the effective diameter of the driving pulley 18. As a result, the RPM ratio "e", i.e., (the rotating speed of the driven pulley 22)/(the rotating speed of the driving pulley 18, $RPM_{out}/RPM_{in}$) is increased. The $RPM_{in}$ is governed by the engine RPM which is represented by $RPM_e$. When the amount of the oil drained from the cylinder 26 through the speed ratio control valve 38 is controlled, the RPM ratio is decreased.

Similarly, the driven pulley 22 has a movable member 36, which is axially displaced on and rotates with the output shaft 20, and a non-movable member 32, which is fixed to and rotates with the output shaft 20. The movable member 36 is axially displaced by the pressure exerted upon it by a hydraulic cylinder 28. When the movable member 36 is axially displaced in a direction toward the opposite member 32, the width defined between the members 32 and 36 is decreased. This results in an increase in the effective diameter of the driven pulley 22.

To minimize the amount of engine power consumed by a hydraulic fluid pump 42, the hydraulic pressure in the cylinder 28 is controlled to be as small as possible while maintaining a torque necessary to keep the belt 24 from slipping while rotating around the driving pulley 18 and the driven pulley 22. The hydraulic pressure in the cylinder 26 is varied to adjust the speed ratio of the CVT 14. The amount of pressure in the hydraulic cylinder 26 is designed to be smaller than that of the hydraulic pressure in the hydraulic cylinder 28. However, even though the value of the hydraulic pressure supplied to the hydraulic cylinder 26 is less than the value of the hydraulic pressure supplied to the hydraulic cylinder 28, the system is designed so that a greater overall hydraulic pressure is realized in the hydraulic cylinder 26 than in the hydraulic cylinder 28 because the cylinder 26 has the larger square exerted upon by the hydraulic pressure than that of the hydraulic cylinder 28. Hence, it is possible to obtain a RPM ratio of more than or at least equal to one. To prevent the belt 24 from being twisted, the movable member 34 of the driving pulley 18 is positioned on the shaft 16 in the opposite side, compared with that of the movable member 36 of the driven pulley 22. The CVT 14 is supplied with hydraulic fluid by using the following procedure:

The hydraulic fluid pump 42, driven by a motor, pumps hydraulic fluid from a reservoir 40 to a pressure regulator valve 44. The pressure regulator valve 44 controls the pressure supplied to an oil passage 46 by adjusting an amount of fluid drained from the system, thereby generating a specific line pressure $P_L$ in the oil passage 46. The pressure regulator valve 44 has a linear solenoid and a valve spool which is actuated by the linear solenoid, therein. The pressure regulator valve 44 supplies the line pressure $P_L$ through the oil passage 46 to the hydraulic cylinder 28 of the driven pulley 22 and to the speed ratio control valve 38. The speed ratio control valve 38 is a three port connection valve, and includes a linear solenoid and a valve spool which is actuated by the linear solenoid, therein. The speed ratio control valve 38 includes an inlet port communicated with the passage 46, a drain port communicated with a drain passage 50 and an outlet port communicated through an oil passage 48 with the hydraulic cylinder 26 of the driving pulley 18. When the speed ratio control valve 38 is in a first position, the inlet port communicates with the outlet port. When the speed ratio control valve 38 is in a second position, there is no communication between the three ports. Finally, when the speed ratio control valve 38 is in a third position, the outlet port communicates with the drain port.

A sensor 60 detects the rotating speed $RPM_{in}$ of the driving pulley 18. A sensor 62 detects the rotating speed $RPM_{out}$ of the driven pulley 22. A throttle opening sensor 56 detects an amount of an opening of a throttle valve 54, which is varied in proportion to a stroke of an accelerator pedal 52 installed adjacent to a passenger seat.

When the hydraulic pressure of the cylinder 28 of the driven pulley 22 increases, the movable member 36 of the driven pulley 22 is displaced to approach to the opposite member 32. Due to this, the contact points between the driven pulley 22 and the belt 24 moves to the points which are positioned in the outer portions of the driven pulley 22. The amount of the line pressure $P_L$ is controlled so that it may not cause the slip between the belt 24 and the pulleys 18, 22. When the hydraulic pressure in the cylinder 26 of the driving pulley 18 increases, the movable member 34 of the driving pulley 18 is displaced to approach to the opposite member 30. Due to this, the contact points between the driving pulley 18 and the belt 24 moves to the point which are positioned in the outer portions of the driving pulley 18. Thus, the speed ratios between the driving and driven pulleys are controlled.

An ECU controls the pressure regulator valve 44 and the speed ratio control valve 38 in accordance with the signals detected by the various sensors. FIG. 1 shows that the ECU functions as a digital computer, and has a central processing unit (hereinafter referred to as CPU) 66 which carries out arithmetic and logic processing functions, an inter-face (hereinafter referred to as I/F) 64, an analog-digital converter (hereinafter referred to as A/D) 58, a random-access memory (hereinafter referred to as RAM) 68 which temporarily stores the calculated data of the CPU 66, a read-only memory (hereinafter referred to as ROM) 70 which stores a predetermined control program and arithmetic constants therein, and a digital-analog converter (hereinafter referred to as D/A) 72. They are connected through inlet-outlet ports (hereinafter referred to I/O ports) 59. An example of how the ECU functions is given by the following. The I/F 64 receives an output signal SE corresponding to the engine speed from the sensor 60, and an output signal SV corresponding to the vehicle speed from the sensor 62. The I/F 64 converts the output signals SE and SV into coded signals which indicate the pulse numbers of the output signals SE and SV per a unit time, and feeds the coded signals to the I/O ports 59. The A/D 58 receives the output signal TH corresponding to the throttle opening from the throttle opening sensor 56. The CPU 66, a microprocessor, then compares the outputs received against any stored information according to the program memorized in the ROM 70, and issues an output to the D/A 72 which then subsequently outputs any appropriate signals SS and SP, and feeds through an actuation circuit 74 to the pressure regulator valve 44 and the speed ratio control valve 38. The actuation circuit 74, for example consisting of an electric power amplifier. The actuation circuit 74 amplifies the signals SS and SP outputted from the D/A 72 with a predetermined gain, and feeds the signals SS and SP to the linear solenoids provided in the speed ratio control valve 38 and the pressure regulator valve 44, respectively. The linear solenoids of the speed ratio control valve 38 and the pressure regulator valve 44, actuate the valve spools which are provided in the speed ratio control valve 38 and the pressure regulator valve 44, respectively.

Figure 3:
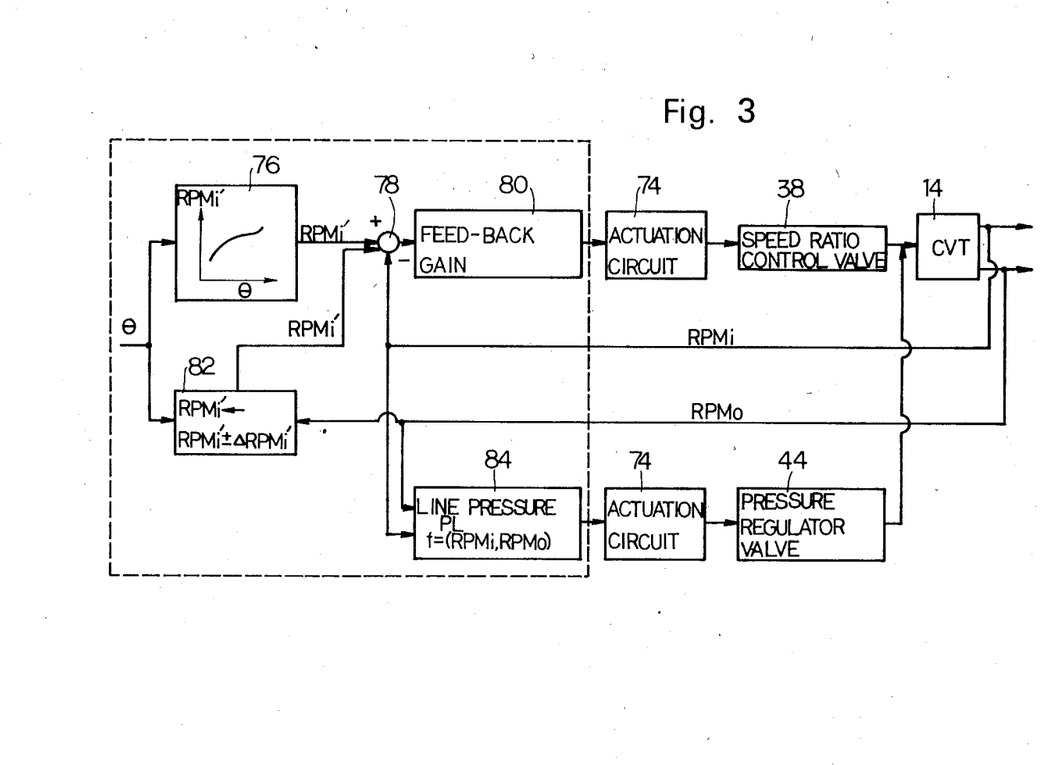
FIG. 3 is a block diagram employed in the embodiment of the present invention in FIG. 2.

FIG. 3 shows a block diagram employed in the embodiment of the present invention shown in FIG. 2. In block 76, a desired engine speed RPMi' (a desired engine speed of the input shaft 16 of the CVT 14) is calculated according to the opening of the throttle valve 54, based upon the predetermined relation between a desired engine speed RPMi' and a throttle opening $\theta$. The desired engine speed RPMi' is determined to be a value with which a minimum fuel consumption is achieved, while obtaining a necessary horsepower corresponding to a throttle opening $\theta$. A comparator 78 determines a speed ratio e and a differential speed ratio e with which the deviation E between the desired engine speed RPMi' and the actual engine speed RPMi may equal zero. The signals of the speed ratio e and the differential speed ratio e are fed through a feed-back gain 80 and the actuation circuit 74 to the speed ratio control valve 38. The speed ratio control valve 38 varies the amount of the hydraulic fluid in the hydraulic cylinder 26 of the driving pulley 18. That is, the speed ratio is varied so that the actual engine speed RPMi may equal the desired engine speed RPMi'.

In block 82, when an engine brake is detected according to the throttle opening $\theta$ and the rotation speed RPMo of the output shaft 20 corresponding to the vehicle speed, the desired engine speed RPMi' is determined in order to maintain the vehicle speed to be a fixed value. According to the desired engine speed RPMi', the speed ratio control is made. In block 84, the optimum line pressure PL is calculated according to the engine speed RPMi and the rotation speed RPMo of the output shaft 20 corresponding to the vehicle speed. The signal which indicates the line pressure PL is fed through the actuation circuit 74 to the pressure regulator valve 44. As a result, the line pressure PL is maintained to be a minimum value in the range where the line pressure PL does not generate a slip between the pulleys and the belt 24, and hence the transmitting torque loss is not generated. This enables to the small power loss and the long endurance of the belt 24.

Figure 4:
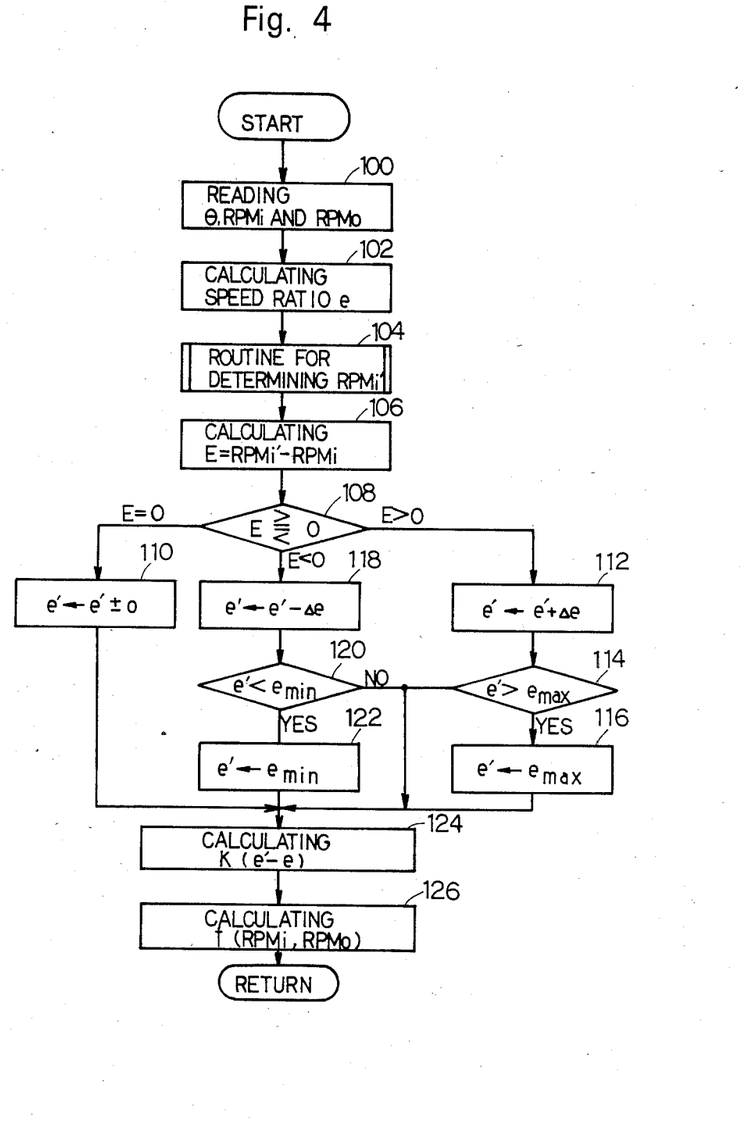
FIG. 4 is a flow chart illustrating operations employed in the embodiment shown in FIG. 2.

The operation of the present embodiment is explained in conjunction with the flow chart shown in FIG. 4.

In step 100, the opening $\theta$ of the throttle valve 54, the actual engine speed RPMi of the engine 10, and the rotation speed RPMo of the output shaft 20 corresponding to the vehicle speed, are read from the signals TH, SE, and SV, respectively. These read values of the signals are memorized in the RAM 68. The program proceeds to step 102. In step 102, the actual speed ratio e (RPMo/RPMi) is calculated. The program proceeds to step 104. In step 104, the desired engine speed RPMi' is calculated.

Figure 5:
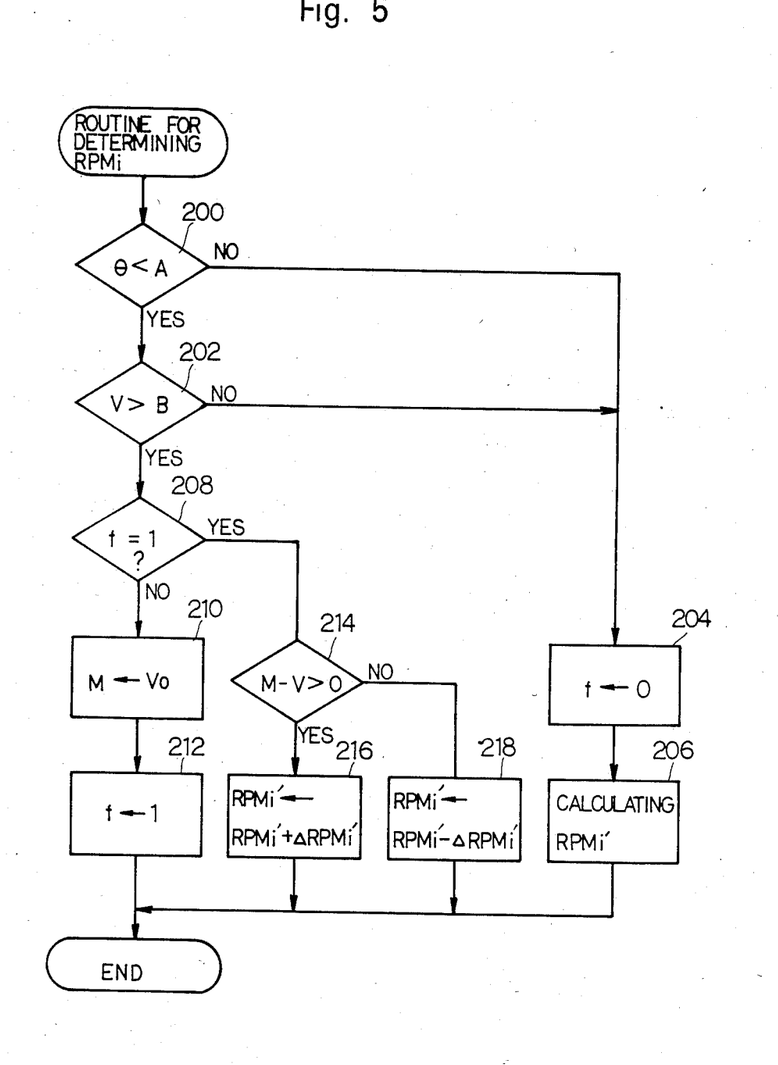
FIG. 5 is a flow chart illustrating operations employed in the embodiment shown in FIG. 2, in order to determine a desired engine speed.

The detailed description of step 104 is made hereunder, in conjunction with the flow chart shown in FIG. 5. In step 200, it is determined whether or not the opening $\theta$ of the throttle valve 54 is less than a predetermined constant A. In step 202, it is determined whether or not the vehicle speed V is more than a predetermined constant B. Here, the constant A is determined to have a relatively small value corresponding to the position where the throttle valve 54 is almost closed. Further, the constant B is determined to have a minimum value in a range where the vehicle speed V has to be controlled to a fixed value, under an effect of the engine brake. Thus, steps 200 and 202 detect whether or not the vehicle runs under the effect of the engine brake.

When the vehicle speed V is less than the constant B regardless of the value of the throttle opening $\theta$, it is determined that the vehicle is not under the effect of the engine brake or the constant speed control is not necessary. The program proceeds to steps 204 and 206. In step 204, the value of a flag f which indicates the running condition under an effect of an engine brake, is changed to zero. The program proceeds to step 206. In step 206, the desired engine speed RPMi' is calculated according to the predetermined relation which is determined by the opening $\theta$ of the throttle valve 54. The predetermined relation is designed to obtain a necessary horsepower, corresponding to the opening $\theta$ of the throttle valve 54, at a minimum fuel consumption.

When the engine brake is detected in steps 200 and 202, the program proceeds to step 208. In step 208, it is determined whether or not the value of the flag f is equal to 1. If the value of the flag f is not equal to 1, the program proceeds to step 210. If the value of the flag f is equal to 1, the program proceeds to step 214. In step 210, the vehicle speed Vo is memorized in a register M which is formed in the RAM 68. The RAM 68 constitutes a vehicle speed memorizing means 3 which memorizes the vehicle speed V at the time when the engine brake is detected, as the desired vehicle speed Vo. The program proceeds to step 212. In step 212, the value of the flag f is changed to 1.

In step 214, it is determined whether or not the value subtracted the actual vehicle speed V from the value of the register M, is positive. When the desired vehicle speed Vo is more than the actual vehicle speed V, the program proceeds to step 216. In step 216, the desired engine speed RPMi' is increased by the predetermined small value $\Delta$RPMi', which is a fixed value. When the desired vehicle speed Vo is less than the actual engine speed V, the program proceeds to step 218. In step 218, the desired engine speed RPMi' is subtracted by the predetermined $\Delta$RPMi'. When the actual vehicle speed V is more than the desired vehicle speed Vo, the desired engine speed RPMi' is decreased. Contrary to this, when the actual vehicle speed V is less than the desired vehicle speed Vo, the desired engine speed RPMo' is increased.

Returning to FIG. 4, in step 106, the deviation E between the desired engine speed RPMi' and the actual engine speed RPMi, is calculated. The program proceeds to step 108. In step 108, it is determined whether the deviation E is positive, negative, or zero. When the deviation E is zero, the program proceeds to step 110. In step 110, the value of the desired speed ratio e' is maintained. The desired speed ratio e' at the initial condition is set to be same as the actual speed ratio e. When the deviation E is positive, the program proceeds to step 112. In step 112, the predetermined small value $\Delta$e is added to the desired speed ratio e'. The program proceeds to step 114. In step 114, it is determined whether or not the desired speed ratio e' exceeds the maximum value $e_{max}$ of the speed ratio. If the desired speed ratio e' is more than the maximum value $e_{max}$, the program proceeds to step 116. In step 116, the value of the desired speed ratio e' is limited within the maximum value $e_{max}$. When the deviation E is negative in step 108, the program proceeds to step 118. In step 118, the predetermined small value Δe is subtracted from the desired speed ratio e'. The program proceeds to step 120. In step 120, it is determined whether or not the desired speed ratio e' is less than the minimum value $e_{min}$. When the desired speed ratio e' is less than the minimum value $e_{min}$, the program proceeds to step 122. In step 122, the desired speed ratio e' is limited so that the desired speed ratio e' may not be less than the minimum value $e_{min}$.

Thus, the desired speed ratio e' is determined. The program proceeds to step 124. In step 124, the deviation between the desired speed ratio e' and the actual speed ratio e, is calculated. Further, in step 124, the differential is multiplied by a constant k, and an amount of the control (feed-back gain) F is calculated. The volume of the hydraulic fluid of the hydraulic cylinder 26 is varied according to the amount F of the control. The actual speed ratio e is controlled to follow the desired speed ratio e'. That is, in the case that the desired speed ratio e' equals the actual speed ratio e, the amount of the control F becomes zero. Hence, the speed ratio control valve 38 becomes in a neutral position, and the amount of the oil of the hydraulic cylinder 26 is maintained to a fixed value. The speed ratio e does not vary. But, in the case that the desired speed ratio e' is more than the actual speed ratio e, the amount of the oil of the hydraulic cylinder 26 is forced to increase, thereby increasing the speed ratio e. Contrary to this, in the case that the desired speed ratio e' is less than the actual speed ratio e, the amount of the hydraulic fluid of the hydraulic cylinder 26 is decreased, thereby decreasing the speed ratio e. The above steps are carried out at a high speed, and the speed ratio e is controlled so that the deviation E between the desired engine speed RPMi' and the actual engine speed RPMi may become zero. Hence, the engine speed is controlled to the optimum value, and the economical driving condition is obtained.

In step 126, the amount of the control, F is calculated according to the predetermined function f(RPMi, RPMo) and the engine speeds RPMi and RPMo which are read in step 100. When a vehicle runs under the effect of the engine brake, this amount F is determined to be a value with which the line pressure may be obtained while obtaining a necessary torque and without keeping the belt 24 from slipping. The signal SP, which is a pressure regulating signal and corresponds to the amount F, is fed into the pressure regulator valve 44, and the pressure regulator valve 44 controls the line pressure to the optimum value.

The another embodiment of the present invention is explained hereunder. Similar reference characters are used to designate like or corresponding parts throughout.

Figure 6:
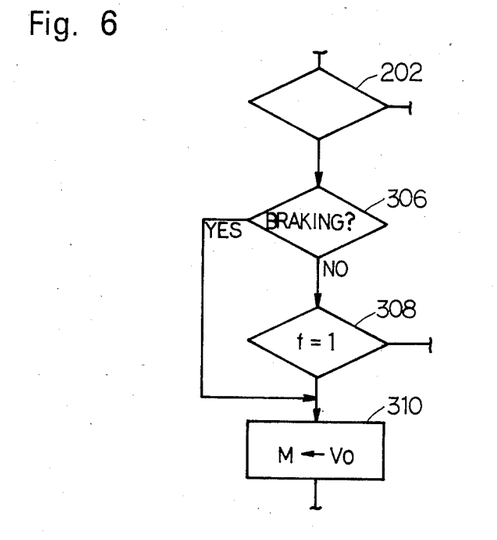
FIG. 6 is a flow chart illustrating operations employed in the another embodiment of the present invention.

As shown in FIG. 6, step 306 may be provided in the position between steps 202 and 308, in order to determine whether or not a brake pedal (not shown in drawings) is displaced. In order to detect the displacement of the brake pedal, a signal of a pedal switch (not shown in drawings), which is operated at the displacement of the brake pedal, is employed.

According to the present embodiment, when the brake pedal is not displaced, the program proceeds from step 202 to step 308, and the same operation as that of the previous embodiment is obtained. When the brake pedal is displaced under the effect of the engine brake, the program proceeds from step 202 to step 310. In step 310, the value of the register M is replaced with the desired vehicle speed Vo at the time when the brake pedal is displaced. The replaced value becomes the new desired vehicle speed Vo. Hence, after the brake pedal is displaced and the vehicle speed is lowered, the actual vehicle speed is maintained to the lowered vehicle speed.

According to the embodiments, the belt type continuously variable transmission 14 is employed, but the other type continuously variable transmission may be employed.

Further, the opening θ of the throttle valve 54 is employed in order to detect the engine load, but the stroke of the accelerator pedal 52, a vacuum pressure generated in an engine intake manifold of the engine 10, and the volume of air suctioned into the intake manifold may be employed instead of the throttle opening θ.

Further, the desired engine speed may be manually set to an appropriate value in the register M.

In step 206 shown in FIG. 5, the desired engine speed RPMi' may be calculated according to the opening θ of the throttle valve 54 and the rotation speed RPMo of the output shaft 20 corresponding to the vehicle speed.

While the present invention has been described in its preferred embodiments, it is to be understood that the invention is not limited thereto, and may be otherwise embodied within the scope of the following claims.

What is claimed is:

1. An apparatus for controlling speed ratios of a continuously variable transmission installed in a vehicle having an engine therein, the transmission having an input shaft and an output shaft and the speed ratio of a rotating speed of the output shaft to a rotating speed of the input shaft being continuously varied, comprising:
   a means for detecting an actual vehicle speed;
   a means for detecting an engine brake of the vehicle;
   a means for memorizing a desired vehicle speed under a condition when the vehicle runs under the effect of the engine brake; and
   a speed ratio control means which controls the speed ratios of the continuously variable transmission so that the desired vehicle speed may equal the actual vehicle speed.

2. The apparatus of claim 1, wherein the apparatus further comprises a throttle means which is actuated to control an amount of a fuel supplied to the engine, and the desired vehicle speed is determined in the condition that the desired vehicle speed is obtained at a minimum fuel consumption rate while achieving horsepower.

3. The apparatus of claim 2, wherein the engine brake is detected according to the detected vehicle speed and the opening of the throttle means.

4. An apparatus for controlling speed ratios of a continuously variable transmission installed in a vehicle having an engine therein, the transmission having a driving pulley with a fixed member and a movable member actuated by a hydraulic cylinder to form a V-shaped opening therebetween, a driven pulley with another fixed member and another movable member actuated by another hydraulic cylinder to form another V-shaped opening therebetween, and an endless member spanning the pulleys so that the effective diameter of the pulleys can be varied with regard to each other and so that different speed ratios can be obtained, the transmission means comprising:
   a means for detecting an actual vehicle speed;
   a means for detecting an engine brake of the vehicle;
   a means for memorizing a desired vehicle speed under a condition when the vehicle runs under the effect of the engine brake; and a speed ratio control means which controls the speed ratios of the continuously variable transmission so that the desired vehicle speed may equal the actual vehicle speed.

5. The apparatus of claim 4, wherein the speed ratio control means is a speed ratio control valve which controls the amount of the oil supplied to or drained from the hydraulic cylinder of the driving pulley.

* * * * *